United States Patent [19]
Carlson

[11] Patent Number: 6,098,148
[45] Date of Patent: Aug. 1, 2000

[54] STORAGE AND ACCESS OF DATA USING VOLUME TRAILER

[75] Inventor: Wayne Charles Carlson, Tucson, Ariz.

[73] Assignee: International Business Machines Corporation, Armonk, N.Y.

[21] Appl. No.: 08/865,433

[22] Filed: May 29, 1997

[51] Int. Cl.[7] .............................. G06F 12/00; G06F 13/00
[52] U.S. Cl. ........................... 711/112; 711/100; 711/111
[58] Field of Search ................................... 711/112, 113, 711/114, 154, 209; 707/204, 205; 360/92, 132, 30, 34; 369/30, 34

[56] References Cited

U.S. PATENT DOCUMENTS

| | | | |
|---|---|---|---|
| 4,130,867 | 12/1978 | Bachman et al. | 707/204 |
| 4,467,421 | 8/1984 | White | 364/200 |
| 4,947,367 | 8/1990 | Chang et al. | 364/900 |
| 5,129,088 | 7/1992 | Auslander et al. | 395/700 |
| 5,455,926 | 10/1995 | Keele et al. | 395/404 |
| 5,459,853 | 10/1995 | Best et al. | 711/112 |
| 5,577,222 | 11/1996 | Micka et al. | 395/439 |
| 5,584,008 | 12/1996 | Shimada et al. | 711/112 |
| 5,584,018 | 12/1996 | Kamiyama | 711/112 |
| 5,606,679 | 2/1997 | Cohn et al. | 711/112 |
| 5,805,864 | 9/1998 | Carlson et al. | 395/500 |
| 5,809,511 | 9/1998 | Carlson et al. | 707/204 |

FOREIGN PATENT DOCUMENTS 7-200636  8/1994  Japan .............................. G06F 17/30

OTHER PUBLICATIONS

U.S. Patent application No. 08/778,118, filed Jan. 2, 1997, entitled "Outboard Data Migration in a Volume Stacking Library", in the names of J. W. Peake et al.; now patent 5809511.

U.S. Patent application No.: 08/707,891, filed Sep. 10, 1996, entitled "Virtual Integrated Cartridge Loader for Virtual Tape Storage System", in the names of Carlson et al.; now patent 5805864.

*Primary Examiner*—Tuan V. Thai
*Attorney, Agent, or Firm*—Gary Cary Ware Freidenrich

[57] ABSTRACT

Digital data records are stored on a direct access storage device (DASD) in emulation of sequential-access media, the efficiency of storage and access of the data being improved by using a volume trailer containing various statistics about the records. Data is preferably stored in records, logically assembled into record groups. Interspersed with the records, there may be one or more marker codes, which function like tape marks among the various data records. The volume trailer contains pointers to each record group, record counts for each group, marker code counts for each group, and may also include fields showing whether records in a given record group are of equal length. The volume trailer may also include a volume trailer "tail", including a byte count for the entire volume trailer, and a unique sequence identifying the volume trailer. Statistics contained in the volume trailer enable substantially more efficient access of the data by a DASD. For example, record groupings, group counts, and/or marker code counts may be employed to perform operations such as locate, forward space file, and backward space file.

23 Claims, 7 Drawing Sheets

STORAGE AND ACCESS OF DATA USING VOLUME TRAILER

BACKGROUND OF THE INVENTION

1. Field of the Invention

The present invention relates to the storage and/or access of digital data. More particularly, the invention concerns a method, apparatus, and article of manufacture using a volume trailer to more efficiently store digital data on a direct access storage device (DASD) in emulation of sequential-access media. Another aspect of the invention concerns the access of data stored pursuant to the invention.

2. Description of the Related Art

Over the years, engineers have developed many different ways of digitally storing data. Two of the most popular involve sequential-access storage drives (i.e., tape media), and DASD. As an example, DASD storage includes magnetic hard disk drives and magnetic floppy diskettes. Tape storage, for instance, includes different electromagnetic or optical wound tapes, and may involve storage patterns such as linear, helical, and serpentine.

DASD and tape storage offer contrasting benefits and limitations. Thus, users may choose DASD for some storage needs, and tape for others. Along these lines, DASD and tape storage have each evolved through the years with contrasting storage formats. This is due to the different physical characteristics of the respective media. In particular, DASD-stored data is randomly accessible, by simply moving a read/write head directly to a specific sector and track location where a desired data item exists. In contrast, tape-stored data is accessed sequentially, by rewinding or advancing the tape until reaching the desired data item.

In tape storage, data is typically stored in units called "records" or "blocks". Interspersed with the records are various headers, each of which contains information describing various characteristics of the associated data record. Adjacent header/record pairs are separated by an inter-block gap (IBG), which is a unique hardware-recognizable pattern of stored data. The IBGs are particularly advantageous when attempting to locate a particular data record on the tape. First, the tape is advanced to a point on the tape where the data record likely begins, or to a point where a group of records including the data record begins. Then, the tape head advances or rewinds, record-by-record, until the desired record is reached. Such movement of the tape head is conducted using the IBGs as guideposts.

In addition to individual record or "block" headers, a tape usually includes a volume header near the beginning of tape (BOT) point. The volume header includes various statistics concerning all records contained on the tape. The volume header is necessarily placed at the tape's beginning because, when a tape cartridge is first loaded to a tape drive, access of the tape begins at the BOT point. To locate the volume header elsewhere would require time consuming forwarding of the tape to reach the volume header.

The foregoing description of tape storage significantly contrasts with DASD storage. Although most formats of DASD storage use headers of various types, DASD storage does not require IBGs. This is because the DASD read/write head, by virtue of its inherent random access capability, can proceed directly to the desired data, without having to sequence record-by-record to find a desired record.

With the advent of virtual tape systems (VTSs), the line between DASD and tape storage has blurred. VTSs chiefly store data on tape, taking advantage of this inexpensive means of long term data storage. However, to expedite data exchanges, data is cached in DASD. According to a predetermined criteria, such as the data's age or recency/frequency of use, the data is backed up on tape. Cache misses result in older data being retrieved from tape and stored again in the DASD cache.

To maintain a consistent data storage format in VTS, it is desirable to use one substantially common tape-like storage format for both DASD and tape media. When this tape-like storage format is applied to DASD, however, some of the normal mechanisms for locating data on tape are no longer useful. Chiefly, the data is not stored with IBGs, which are inapplicable to the direct-access storage format. Even with IBGs, however, access to DASD data would be severely retarded by requiring the DASD head to sequence record-by-record through the data, when direct access is possible. Thus, certain improvements to strict tape storage formats are needed for storing data in the VTS environment, to take advantage of the inherently rapid data access potential of DASD storage.

SUMMARY OF THE INVENTION

Broadly, the present invention concerns the use of a volume trailer to more efficiently store and access digital data on/from a DASD to emulate sequential-access media. According to one particular embodiment, data is stored in records, logically assembled into record groups. Interspersed with the records, there may be one or more marker codes, which function like tape marks among the various data records. The volume trailer contains pointers to each record group, record counts for each group, marker code counts for each group, and indicators of whether records in each record group are of equal length. The volume trailer may also include a volume trailer "tail", including information such as a byte count for the entire volume trailer, and a unique sequence identifying the volume trailer.

The statistics contained in the volume trailer enable substantially more efficient access of the data by a DASD. For example, the invention includes specific techniques employing record groupings, group counts, and/or marker code counts to perform operations such as locate, forward space file, and backward space file.

As an example, the locate routine starts by receiving identification of a target data record, such as a record number. Then, group count fields of the volume trailer are referenced to identify a target record group containing the target data record. The pointer field corresponding to the target record group points to its beginning address in storage. A beginning record header is read at the first address to determine whether the first record header corresponds to the target data record. If the first record header does not correspond to the target data record, the routine repeatedly advances to a succeeding record header and reads the succeeding record header until a record header corresponding to the target data record is read.

The forward space file routine advances from an original or "current" address to a target address containing the next marker code following the original address. First, the routine consults the volume trailer to determine the number of marker codes in the original record group. Then, if the original record group contains marker codes, the routine sequentially advances through each remaining record until a first marker code is reached. Otherwise, if the original record group does not contain any marker codes, or none was found after the starting point, the volume trailer is consulted to determine whether any record groups subsequent to the original record group contain any marker codes. If no record groups subsequent to the original record group contain any marker codes, an error message is issued.

Otherwise, if one or more record groups subsequent to the original record group contains any marker codes, the routine consults the volume trailer to identify a beginning address for a first one of said record groups subsequent to the original record group containing any marker codes, and sequentially reads each record header starting at the beginning address until reaching the first marker code in the first record group.

The backward space file routine of the invention proceeds in reverse from an original address to a target address containing the marker code previous to the original address. The routine first consults the volume trailer to determine the number of marker codes in the original record group. If the original record group contains marker codes, the routine consults the volume trailer to determine the beginning address of the original record group, and starting at the beginning address, sequentially advances through each remaining record until reaching a last marker code prior to the original address.

If the original record group does not contain marker codes before the starting point, the routine consults the volume trailer to determine whether any record groups previous to the original record group contain marker codes. If no record groups prior to the original record group contain any marker codes, an error message is issued. Otherwise, if one or more record groups prior to the original record group contains any marker codes, the routine consults the volume trailer to identify a beginning address for a last one of said record groups prior to the original record group containing any marker codes, and sequentially reading each record header starting at the beginning address until reaching the last marker code in the last record group.

In one embodiment, the invention may be implemented to provide a method to store and/or access store digital data having a volume trailer of constructed according to the invention. In another embodiment, the invention may be implemented to provide an apparatus to store and/or access digital data stored with a volume trailer constructed according to the invention. In still another embodiment, the invention may be implemented to provide a programmed product comprising signal-bearing media tangibly embodying a program of machine-readable instructions executable by a digital data processing apparatus to perform method steps for storing and/or accessing digital data stored with a volume trailer constructed according to the invention.

The invention affords its users with a number of distinct advantages. For example, the invention provides an especially efficient means for rapidly locating particular stored digital data records. This is because the volume trailer contains information including various specialized pointing, counting, and marking information. One particularly advantageous application of the invention is in VTS systems, where digital data is stored on DASD, which emulates tape storage. The volume trailer of the invention aids in locating DASD-stored data, which lacks certain location information normally available in tape-stored data.

The forward and backward space file operations using the invention's volume trailer are especially efficient in comparison to implementation of these operations without the volume trailer, using a combination of rewind and read operations. In particular, lacking the volume trailer, the backward space file operation would require scanning of the volume up to a current position, noting where the last marker code was found, then rewinding and scanning back to the marker code position. Thus, the availability of the pointers and counters provided by the volume trailer of the invention significantly boosts the speed of accessing data.

The invention also provides a number of other advantages and benefits, which will be apparent from the following description of the invention.

BRIEF DESCRIPTION OF THE DRAWINGS

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Hardware Components & Interconnections
Data Storage Media

Broadly, the present invention concerns the use of a storage format having certain characteristics to more efficiently store and access digital data on/from a DASD to emulate sequential-access media. Under this storage format, a logical volume of data concludes with a volume trailer, containing various statistical information about the preceding data.

This data storage format may be implemented in a number of different storage environments. Of particular advantage, however, is the implementation of this format to store data in a DASD, in emulation of sequential-access storage media. Preferably, then, the foregoing data storage format is used to store data in one or more DASDs, such as hard drives, floppy diskettes, optical discs, electronic memory provided by integrated circuitry, etc. Nonetheless, the invention also contemplates use of this format for other storage media, including as sequential-access media such as magnetic tape, optical tape, etc.

The details of one example of this storage format are set forth below.

Data Storage Format
Introduction

Although preferably implemented in DASD storage, the data storage format of the invention logically groups related data into a volume, similar to a volume of data stored on a tape. While stored in DASD, however, a volume of data has certain advantages over a tape-stored volume. For instance, the volume may be appended without regard for limitations such as tape storage capacity. Furthermore, the data can be more quickly accessed, since it is randomly accessible, unlike tape-stored data.

Even though randomly accessible, the data in each volume is logically ordered in a sequence. This sequence may progress, for example, from a beginning address on DASD to an ending DASD address. The addresses need not be contiguous, however, and the addresses and the data sequence may be any other desired relationship, e.g. arbitrary.

Figure 1:
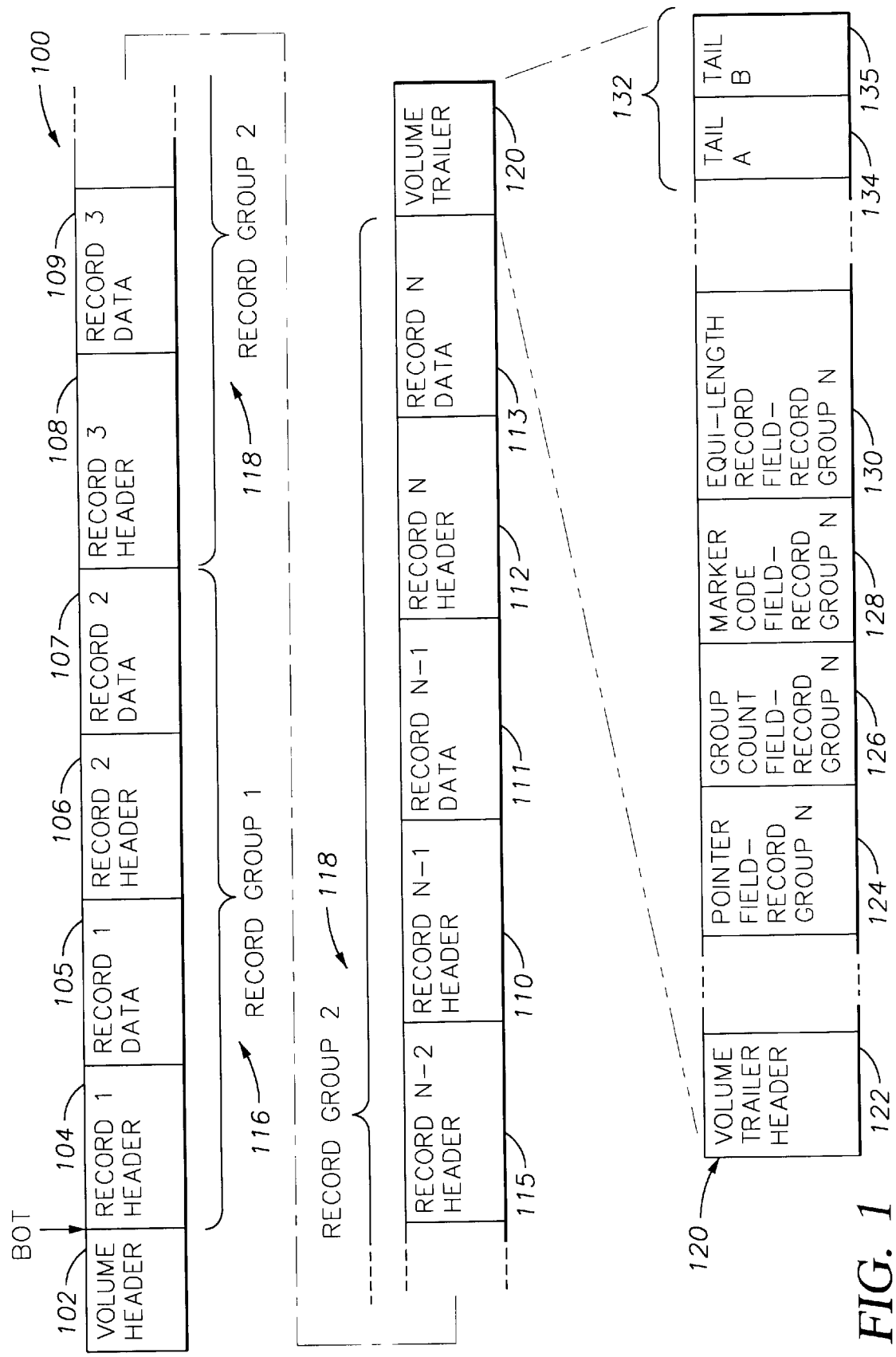
FIG. 1 is a block diagram illustrating a preferred volume data storage format, with an exploded view of a volume trailer according to the invention.

FIG. 1 depicts an exemplary storage format for a volume 100 of data.

Volume Header

First in the data sequence of the volume 100, there is a volume header 102. The volume header 102 may include any desired information about data records of the volume. As an example, the volume header 102 may include some similar information as known volume headers employed by ordinarily skilled artisans in the tape storage arts. The volume header preferably includes information to identify the volume, data and time stamp information, specification of a format used to represent the data storage format used, and validity verification data such as logical redundancy check (LRC), cyclical redundancy check (CRC), checksum, etc. The volume header may, for example, have a fixed length, thereby establishing a consistent predetermined position for the first data record in the volume.

Data Records & Record Groups

Data in a volume occurs in the form of data records, such as the data records 105, 107, 109, 111, and 113. Each data record has a corresponding record header, which precedes the data record. As illustrated, data records 105, 107, 109, 111, and 113 are preceded by record headers 104, 106, 108, 110, and 112. The header 115 exists without a corresponding data record, for reasons explained below. The records are preferably numbered with consecutive integers, as shown in FIG. 1 (e.g., record 1, record 2, etc.).

Data records are logically grouped into "record groups", each record group containing a number of data records that are logically adjacent to each other in the prescribed data sequence. In the illustrated example, a first record group 116 includes data records 105 and 107, as well as the corresponding headers 104 and 106. A second record group 118 includes data records 109, 111, 113, and the record headers 108, 115, 110, and 112.

The data records may vary in size, depending upon the amount of data in that record. In some circumstances, however, it may be desirable to have all records in a group be equi-sized. Nonetheless, the data records and record headers are logically concatenated to each other within the volume 120.

Each record header includes various information about the subsequent data record. In an illustrative embodiment, each record header is twelve bytes long, and includes the following components:

1. a four byte field listing the length of the corresponding data record.
2. a field listing an integer "record number"of the corresponding record, according to its order in the data sequence.
3. a field containing an ASCII "H", uniquely identifying the record header as such.
4. a record type field, indicating whether the record header constitutes (1) a marker code, which has no corresponding data record, or (2) a record header having a corresponding data record; as an example, the record type field may comprise a binary code such as a designated bit.

If desired, record headers and data records may also include validity checking information such as LRC, CRC, checksum, etc.

Marker Codes

With sequential-access media, it is often useful to include "tape marks", which operate as selectively placed bookmarks to designate certain locations in the data. This saves time when sequentially advancing or rewinding through the media to find a certain spot. Known DASD storage formats have no use for "tape marks", however, since the data maintained by DASDs is randomly accessible.

Since the data storage format of the present invention emulates tape storage on directly accessible storage media, however, it is advantageous for this format to represent tape marks. This is because, in a VTS environment, the DASD-stored data is actually used by a tape-compatible application program or host.

Thus, the invention satisfies the function of tape marks with "marker codes". Preferably, a marker code comprises a record header without any corresponding data record. An example is the marker code 115. Lacking an associated data record, the marker code in the illustrated example may be eight bytes long, as the four byte field representing the length of data is unnecessary.

Thus, the data storage format of the invention includes a marker code to mark locations in DASD-stored data, analogously to a tape mark in sequential-access media. Unlike tape storage, however, the data storage format of the invention employs the marker codes more efficiently than possible with tape marks on sequential media, by advantageously invoking the random access capability of DASD storage. This is achieved using various statistics regarding marker codes, stored in a "volume trailer" as discussed below.

Volume Trailer

According to the data storage format of the invention, the logical sequence of each volume of data advantageously concludes with a volume trailer containing various statistics about the logically preceding volume. An exemplary volume trailer is shown by the volume trailer 120. The volume trailer 120 sharply diverges from known tape storage formats, because it is stored at the end of data, and also because of its content. In tape storage, statistical information about volume data is necessarily placed at the tape's beginning because, when a tape cartridge is first loaded to a tape drive, access of the tape begins at the BOT point. To locate the volume header elsewhere would require time consuming forwarding of the tape to reach the volume header.

Advantageously, the invention contemplates reproduction of contents of the volume trailer by examining the preceding contents of the volume 100. Thus, lack of a volume trailer is recoverable by expending recovery time to examine and quantify the information contained on the volume 100. The volume trailer may be absent for various reasons, such as abortion of a storage operation, an unexpected power-off, etc.

The contents of the exemplary volume trailer 120 are discussed below.

Volume Trailer Header

The volume trailer 120 includes a volume trailer header 122, which contains various overhead information concerning the contents of the volume trailer 120. For example, the header 122 may list the name of the volume 100, a count of record groups in the trailer 120, an error code such as a LRC, CRC, or checksum, and a unique code identifying the header 122 as a volume trailer header.

Fields

The volume trailer 120 also includes an assembly of fields for each record group preceding the volume trailer. More particularly, each record group of the volume 100 also has a pointer field, group count field, marker code field, and equi-length record field in the volume trailer 120. In the illustrated example of FIG. 1, fields are shown for a representative record group numbered "N". The pointer field 124 contains a pointer to the corresponding record group N. This pointer points to the beginning the corresponding record group N. As an example, the pointer may list the address of the first header in the record group corresponding to that pointer.

Each record group also includes a corresponding group count field 126 in the volume trailer 120. The field 126 lists the number of data records in the corresponding record group N. For the record group 116, for example, a group count field (not shown) would count two records.

As mentioned above, each record group in the volume 100 also has a marker code field in the trailer 120. Each marker code field contains a count of the number of marker codes in the corresponding record group. For marker code filed 128 corresponding to the record group 118, for example, the count would be "one".

As stated above, the volume trailer 120 also includes an equilength (or "equi-size") record fields, such as the equilength record field 130, for each record group in the volume 100. The field 130 indicates, for the corresponding record group N, whether the data records in that group are equi-sized. Preferably, the field 130 comprises a binary bit storing one predetermined value (e.g., binary "one") if the corresponding record group contains identically sized data records, and a different predetermined value (e.g., binary zero) if the corresponding record group contains data records of varying sizes. Any record group containing marker codes as well as data records is ineligible for equi-length record status, because marker codes as illustrated constitute record headers with no associated data record.

Volume Tail

Preferably, the volume trailer 120 concludes with a volume trailer "tail" 132. In the illustrated embodiment, the tail 132 includes a byte count 134 indicating the number of bytes in the volume trailer 120, and a unique code 135 identifying the volume trailer 120 as such.

Data Storage Subsystem

As mentioned above, the data storage format of the invention may be implemented in a number of different storage environments. In the preferred embodiment, however, DASD storage is used. Accordingly, one aspect of the invention concerns a data storage subsystem, configured to store and access data employing the unique storage format of the invention.

Figure 2:
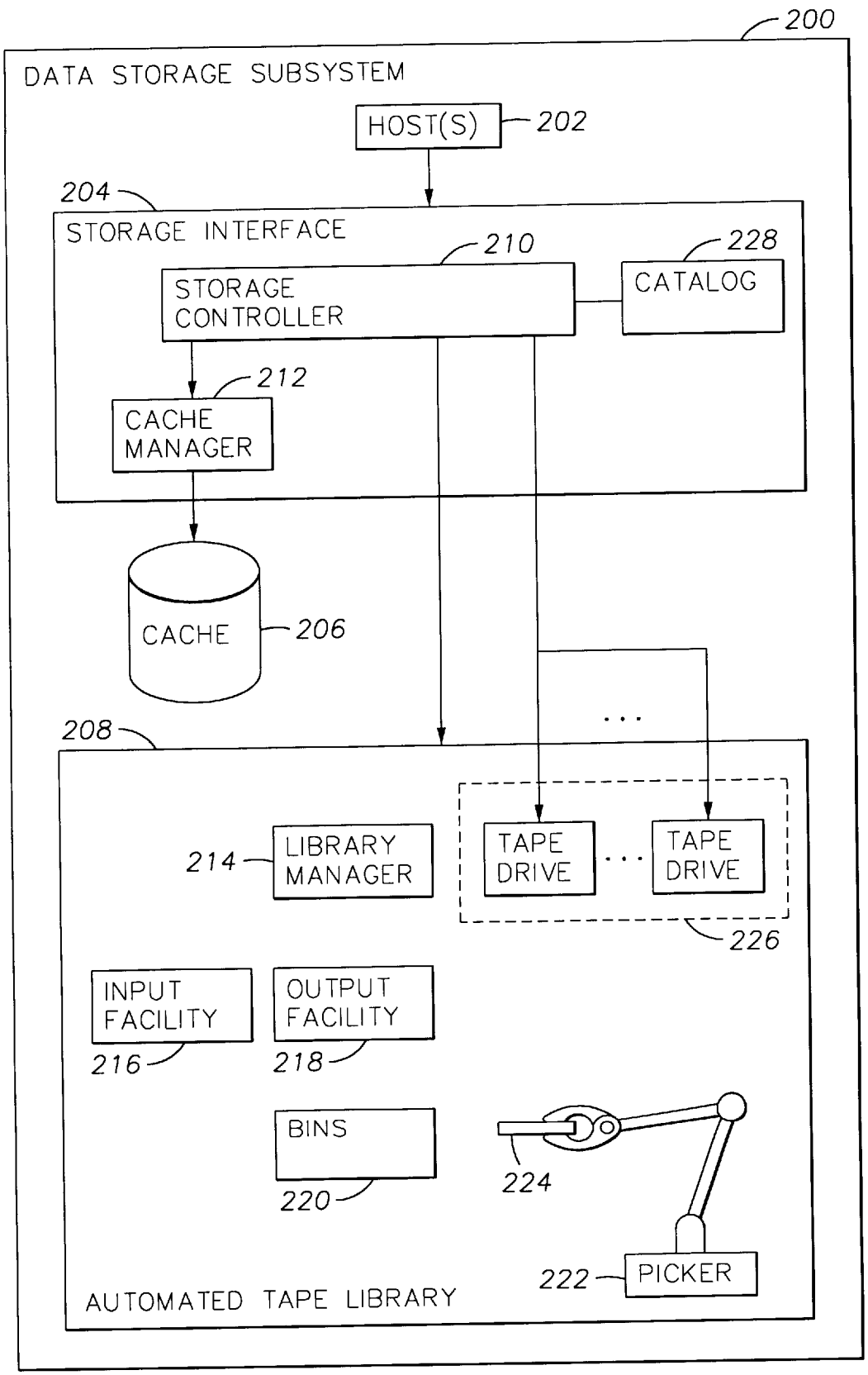
FIG. 2 is a block diagram of a data storage subsystem according to the invention.

FIG. 2 depicts various hardware components and interconnections of one exemplary data storage subsystem 200 of the invention. The subsystem 200 includes one or more hosts 202, a storage interface 204, and an automated tape library 208. Optionally, for reasons explained below, the subsystem 200 may also include a cache 206. Broadly, the hosts 202 comprise one or more units that utilize data stored on the cache 206 and library 208. In an exemplary implementation, the hosts 202 may be embodied by a variety of types and numbers of units, such as: mainframe or personal computers; workstations; user consoles, keyboards, or terminals; application programs; etc. The storage interface 204 exchanges data between the hosts 202 and the cache 206, and between the hosts 202 and the library 208. These exchanges are conducted in accordance with commands from the host 202. As an example, the storage interface 204 may be implemented by executing appropriate software programming with a processing unit such as a IBM model RS6000 RISC computer. The storage interface 204 and cache 206 may be embodied, for example, in an IBM model 3494 B16 virtual tape server.

The automated tape library 208 comprises an apparatus that manages the storage, loading, unloading, movement, writing, and reading of portable sequential storage media, such as tapes 224. The tapes 224 are stored in bins 220. A picker 222, such as robotic arm, selectively directs tapes 224 from an input facility 216, to an output facility 218, and to/from tape drives 226. The input facility 216, for example, may include a batch loading mechanism (not shown) for receiving tapes from an operator, along with one or more tape storage slots. Similarly, the output facility 218 may include a batch output mechanism (not shown) for transferring tapes from the library 208 to an operator, along with one or more tape storage slots.

The tape library 208 may comprise a new design, or a conventional tape library. As an example, the tape library 208 may comprise an IBM model 3494 tape library with at least (1) an IBM 3490 model C2A tape drive to access the following types of tapes: the IBM CST tape (standard cartridge system tape, 28 or 26 track format), and the IBM ECCST tape (enhanced capacity cartridge system tape, 26 track format), and (2) an IBM 3590 model B2A tape drive to access the IBM HPCT tape (high performance cartridge tape, 228 track format). The library 208 also includes a tape library manager 214, which oversees operations of the library 208, and may comprise a new design or a conventional manager for the specific configuration embodied by the library 208. In the illustrated example, the tape library manager 214 may comprise a the library manager used in the IBM model 3494 tape library.

The cache 206, an optional component, may be included in the subsystem 200 to provide a fast-access data storage location. As discussed in greater detail below, newly received data may be first stored in the cache 206, and then immediately migrated to the tape library 208, or migrated to the tape library 208 upon satisfaction of some criteria, such as a period or level of non-use. In an illustrative embodiment, the cache 206 may comprise a magnetic disk storage device such as a high data capacity "hard drive."

The storage interface 204 includes a storage controller 210, a cache manager 212, and a catalog 228. The cache manager 212 oversees operations of the cache 206, and may comprise a new design or a conventional manager for the type of data storage device embodied by the cache 206. In the illustrated example, the cache manager 212 may comprise a disk drive controller. The catalog 228 is used by the storage controller 210 to maintain information about the location of the data stored within the data storage subsystem 200.

The storage controller 210 directs operations of the managers 212/214 and also moves data to/from the tape drives 226. The storage controller 210 receives commands and data from the hosts 202, and issues appropriate commands to direct the managers 212/214 to take the necessary actions to execute the hosts' commands. The storage controller 210 may comprise a digital processing apparatus such as a microprocessor, personal computer, or more advanced processing machine.

Additional information about tape emulation systems, some of which are well known in the art, is provided by the following references: (1) U.S. Pat. No. 4,467,421, entitled "Virtual Storage System & Methods", issued Aug. 21, 1984, (2) U.S. patent application Ser. No. 08/707,891, entitled "Virtual Integrated Cartridge Loader for Virtual Tape Storage System", filed on Sep. 10, 1996 in the names of Carlson et al, now U.S. Pat. No. 5,805,864 and (3) U.S. patent application Ser. No. 08/778,118, entitled "Outboard Data Migration in a Volume Stacking Library", filed on Jan. 2, 1997, in the name of J. W. Peake, now U.S. Pat No. 5,809,511. The contents of the foregoing references are incorporated by reference.

Digital Data Processing System

The data storage format of the invention may be implemented in a number of different ways, depending upon the specific needs of the application. As one example, the format may be applied by the cache manager 206 when storing data to DASD. Alternatively, the format may be implemented on a higher level, such as by the storage controller 210 or host 202.

Wherever implemented, in the subsystem 200 or elsewhere, the data storage format of the invention is preferably applied by an electronic formatting unit (not shown) that may be provided by discrete circuitry, application-specific integrated circuitry, programmable circuit components, logic circuitry, or a combination. As another alternative, some of the features of this module may be implemented in software, while others are implemented using suitable hardware.

Figure 3:
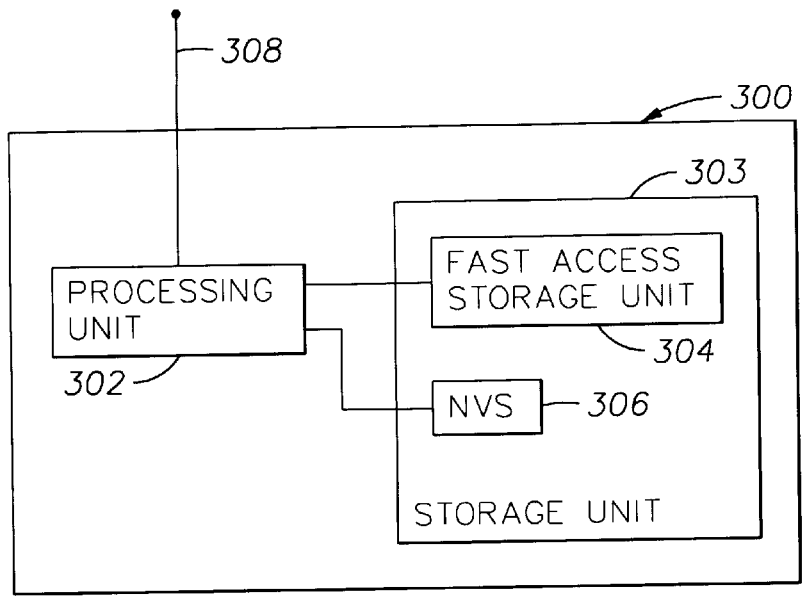
FIG. 3 is a block diagram of a digital data processing system according to the invention.

In the preferred embodiment, however, the formatting unit is implemented in software, by using a digital computer to execute a sequence of programming instructions. In this embodiment, then, the components of the formatting unit comprise software modules or functional units, rather than actual hardware components. This embodiment is therefore implemented using a digital computer 300, as shown in FIG. 3.

The computer 300 includes a processing unit 302, such as a microprocessor or other processing machine, coupled to a storage unit 303. The storage unit 303 may, for example, include a fast-access storage unit 304 and a nonvolatile storage unit 306. The fast-access storage unit 304 preferably comprises random access memory, and may be used to store the programming instructions executed by the processing unit 302 during such execution. The nonvolatile storage unit 306 may comprise, for example, one or more magnetic data storage disks such as a "hard drive", a tape drive, or any other suitable storage device. The computer 300 also includes an input/output 308, such as a line or bus for exchanging data with the processing unit 302.

Despite the specific foregoing description, ordinarily skilled artisans (having the benefit of this disclosure) will recognize that the computer 300 may be implemented in a computer of different construction, without departing from the scope of the invention. As a specific example, one of the storage units 304/306 may be eliminated, or both units 304/306 may be eliminated with the processing unit 302 including on-board storage instead. Furthermore, some or all of the components 302/304/306 may be shared by other hardware devices, in the data storage subsystem 200 or elsewhere.

Operation

In addition to the various hardware embodiments described above, a different aspect of the invention concerns various methods for storing, sequencing through, and locating stored data referenced by a volume trailer.

Signal-Bearing Media

In the specific example of FIG. 2, these methods of the invention (described in detail below) may be implemented by operating the cache manager 212, storage controller 210, or another suitable electronic module to execute a corresponding sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to store or access data referenced by a volume trailer.

Figure 4:
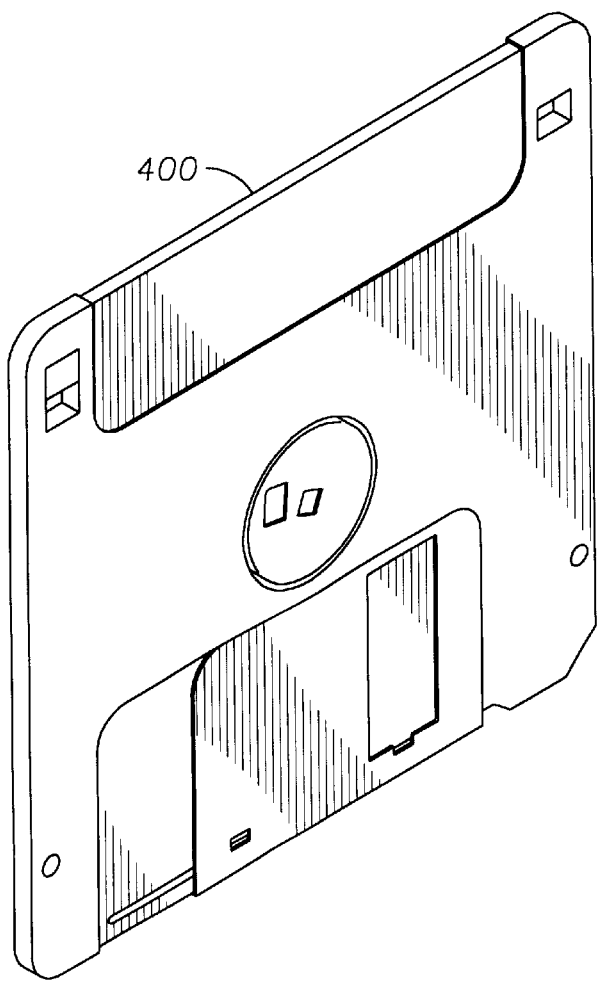
FIG. 4 is a perspective view of a programmed product in accordance with the invention.

This signal-bearing media may comprise, for example, RAM contained within the storage unit 303 of the computer 300. Alternatively, the instructions may be contained in another signal-bearing media, such as a magnetic data storage diskette 400 (FIG. 4). Whether contained in the storage unit 303, diskette 400, cache manager 212, storage controller 210, or elsewhere, the instructions may instead be stored on another type of data storage medium such as DASD storage (e.g., a conventional "hard drive" or a RAID array), magnetic tape, electronic read-only memory (e.g., CD-ROM or WORM), an optical storage device (e.g. WORM), paper "punch" cards, or other suitable signal-bearing media including transmission media such as digital and analog and communication links and wireless. In an illustrative embodiment of the invention, the machine-readable instructions may comprise lines of compiled C language code.

Method Sequences

Write

In the illustrated embodiment, the reading and writing of record headers and data records is performed with a physical component of the cache 206, such as a read/write head (not shown). Alternatively, instead of a physical device such as a read/write head, a software pointer (not shown) may be advanced to a desired address to read or write data from/to that address. This embodiment is especially applicable where the cache 206 includes randomly accessible integrated circuit memory, such as RAM.

A write operation involves building the appropriate record header, then writing the record header followed by the data record. Multiple write operations involve separately writing record headers and data records, resulting in a series of multiple logically concatenated record headers and data records.

The volume trailer 120 may be written when the host 202 indicates it is finished processing a virtual volume 100 by issuing an "unload" request. The volume trailer 120 is preferably written at other significant events as well, such as various synchronization points, known to those in the art as "sync points". Some exemplary sync points, resulting in writing of the trailer 120, include changing from write mode to read mode, an explicit sync command from a host 202 a repositioning event such as a "locate" operation, etc. Writing the volume trailer 120 at these times helps prevent inadvertent loss of the volume trailer information in case of a traumatic even such as an unexpected power-off condition.

Read

A read operation involves reading a record header, verifying it, extracting the data length from the header, then reading the corresponding record data of the specified length. Depending upon the physical implementation of the cache 206, the read/write device (or software pointer) is then positioned to read the next record header. With marker codes, which have no associated data record, no data record is read. After reading the marker code, the read/write device (or software pointer) is then positioned to read the next record header.

Such read operations can be performed until reaching the volume trailer, or the end of disk file. At this point, any further read requests are rejected, and the position of the read/write device (or pointer) remains unchanged.

Rewind

A rewind operation simply changes the position of the read/write device (or pointer) to the BOT position, immediately after the volume header 102.

Forward/Backward Space Block

These operations simply move the read/write device (or pointer) to the next record header in the data sequence (forward space block), or the previous record header in the data sequence (backward space block).

The forward space block operation is performed by reading the current record header to obtain the length of its associated data record. This information is used to compute the position of the next record header, to which the read/write device (or pointer) is then advanced.

A backward space block is performed by consulting the volume trailer 120 to identify the beginning address of the current record group, and then progressing with forward space blocks to the record header prior to the current record header. If the current data record is the first data record in a record group, the backward space block operation is performed by consulting the volume trailer 120 to identify the beginning address of the previous record group, and their progressing with forward space blocks to the last record header int hat record group. Alternatively, with equi-sized data records, a backward space block may be performed by starting from a record header and jumping backwards an even distance equal to the starting record's length plus the standard record header's length.

Accessing Volume Trailer

When a volume, such as the volume 100, is opened, the volume trailer is located by positioning at the end of the volume, less the size of the trailer tail 132. This information of the tail 132 is read, and, if it appears to be a valid tail, the byte count information 134 is used to position to the beginning of the volume trailer 120. The trailer is then read and further validated. If the trailer 120 is not found or is invalid for some reason, the necessary information may be rebuilt by scanning through the volume 100, as discussed above.

Data Storage

Figure 5:
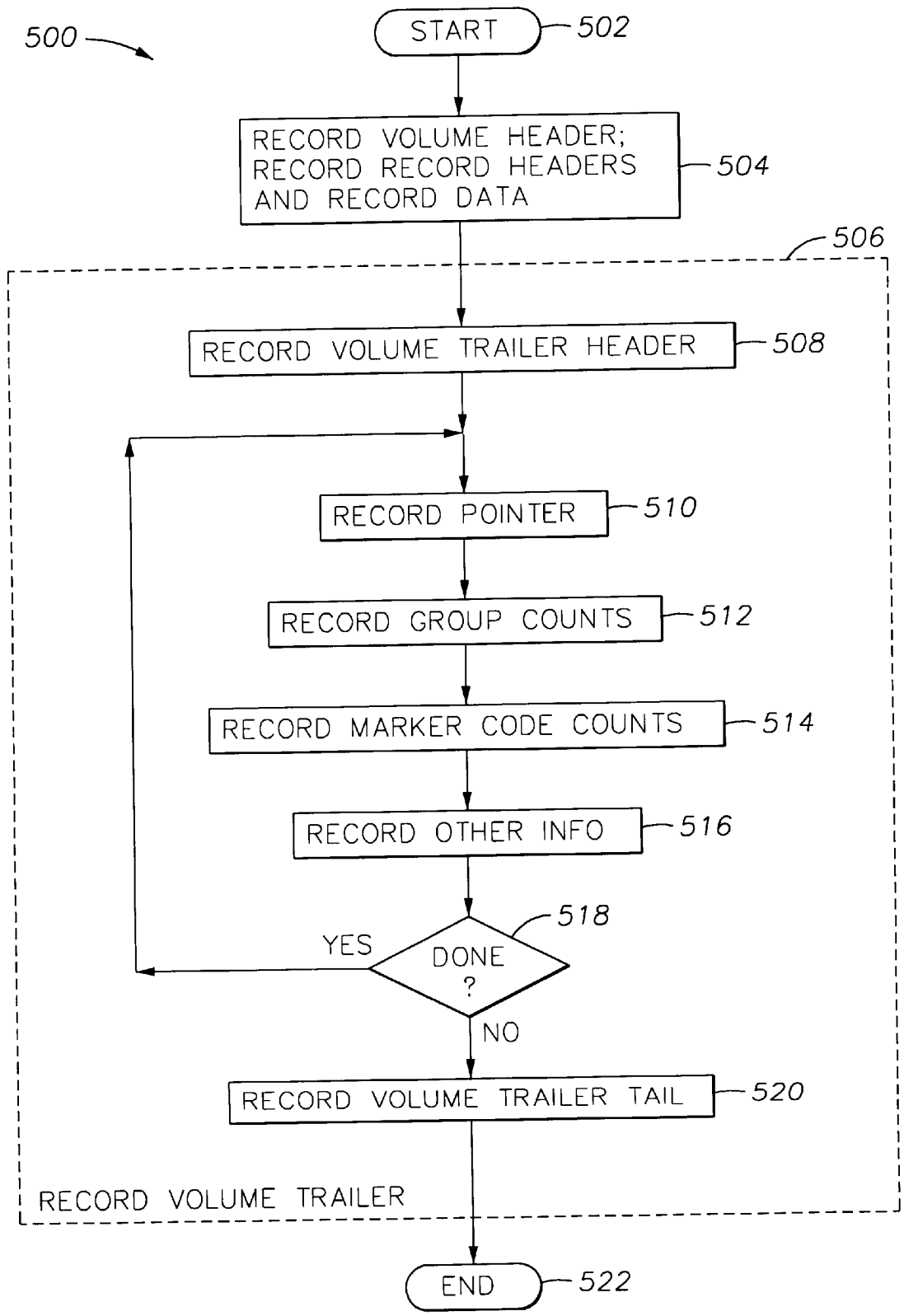
FIG. 5 is a flowchart illustrating a routine for storing data in a preferred format, according to the invention.

Another method of the invention concerns the storage of data volumes, as specifically illustrated by the sequence 500 of FIG. 5. For ease of explanation, but without any limitation intended thereby, the example of FIG. 5 is described in the context of the data storage subsystem 200 and volume 100 described above. In this example, the steps 500 are initiated in step 502, when the cache manager 212 commences storage of a volume 100 of data in the DASD cache 206.

Following step 502, the cache manager 212 writes the volume header 102, and then each record header and corresponding data record. In addition to write operations step 504 may also include various tape access operations, such as reads, locates, etc. After step 504, the cache manager 212 records the volume trailer 120 in step 506. As mentioned above, step 506 may be performed at various times, such as issuance of an unload request, change from read to write mode, etc. Step 506 includes storage of the volume trailer header 122 (step 508), and for each record group, a pointer field 124 (step 510), a group count field 126 (step 512), a marker code field 128 (step 514), and other information such as the equi-length record field 130 (step 516). Although not shown, the cache manager 212 preferably computes the values stored in the fields 124, 126, 128, 130, and 132. One performance of steps 510–516 thus writes the fields 124–130 for a particular record group. Step 518 then determines whether all record groups have been presented in the volume trailer 120. If not, steps 510–516 are repeated. Otherwise, step 520 proceeds to write the tail 132 after all data records and record headers have been written to the volume trailer 120.

After step 520, the routine 500 ends in step 522.

Locate

Figure 6:
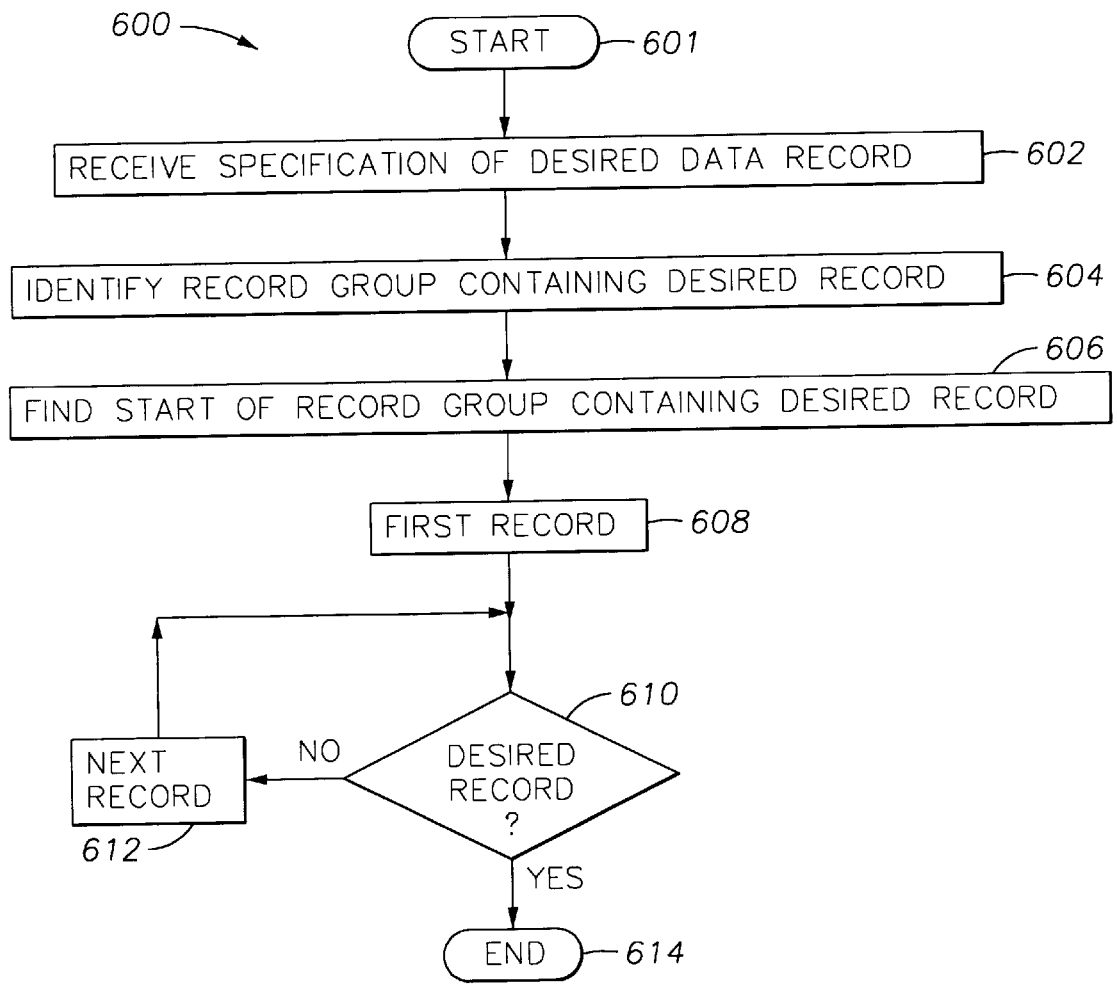
FIG. 6 is a flowchart illustrating a locate routine according to the invention.

Another method of the invention concerns the location of a desired data record stored in a volume formatted according to the invention. A specific example of this method is illustrated by the sequence 600 of FIG. 6. For ease of explanation, but without any limitation intended thereby, the example of FIG. 6 is described in the context of the data storage subsystem 200 and volume 100 described above. In this example, the steps 600 are initiated in step 601, when the storage controller 210 initiates a locate operation to find a desired data record in a particular volume 100 stored in the DASD cache 206.

Following step 601, the storage controller 210 in step 602 receives an identification of a desired ("target") data record to locate. In this example, the target data group is identified by its record number. Next, the storage controller 210 in step 604 references the group count fields 126 of the volume trailer 120 to identify the record group containing the target data record.

Next, the storage controller 212 references the pointer field 124 of the volume trailer 120 to identify the address where the record group containing the desired record begins. As an example, step 606 may also involve movement of a read/write head (or pointer) to the record group's beginning address. Following step 606, the storage controller 212 commands the cache 206 to read the record header at the beginning address. Step 610 then determines whether the first record header corresponds to the target data record. If so, the desired data record has been found, and the routine 600 ends in step 614. Otherwise, step 610 branches to step 612, in which the storage controller 212 commands the cache 206 to read the next-ordered record header in the volume 100. Steps 610/612 repeatedly advance through successive record headers until the record header corresponding to the desired data record is found. After step 610 answers in the affirmative, the routine 600 ends in step 614. Proceeding to the next record header is achieved by performing a forward space block. Alternatively, if the target record group's equi-length record field 130 reveals that records of this group are equi-sized, steps 610–612 may be abbreviated by computing the beginning address of the target data record and advancing directly there. This address is easily computed with knowledge of the common size of all data records (from step 608) and the standard size of all record headers.

Forward Space File

Figure 7:
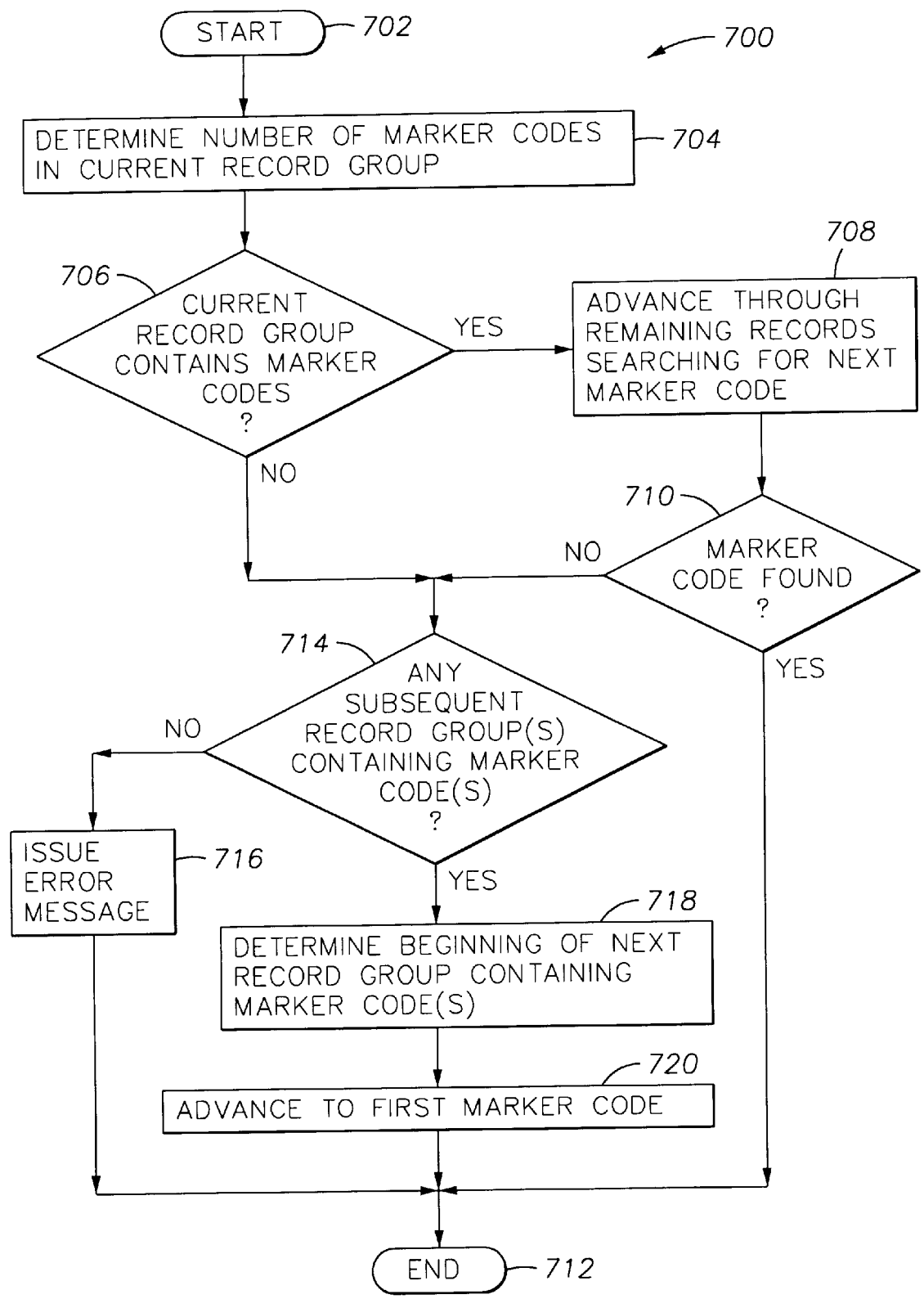
FIG. 7 is a forward space file routine according to the invention.

Another method of the invention concerns the advancement from an original address to a target address containing the next marker code following the original address. This emulates a tape operation called a "forward space file". A specific example of this method is illustrated by the sequence 700 of FIG. 7. For ease of explanation, but without any limitation intended thereby, the example of FIG. 7 is described in the context of the data storage subsystem 200 and volume 100 described above.

In this illustrated example, the steps 700 are initiated in step 702, when the storage controller 210 initiates a forward space file operation to advance a read/write head (not shown) from an original address in the cache 206 to the next marker code in the data sequence. Alternatively, instead of a physical device such as a read/write head, the routine 700 may serve to advance a software pointer from an original address to the next marker code. This embodiment is especially applicable where the cache 206 includes randomly accessible integrated circuit memory, such as RAM. The "original" or "current" address is the address at which the read/write head (or pointer) is positioned upon commencement of the routine 700.

After step 702, step 704 determines the number of tape marks in the original record group. There may be zero, one, or multiple marker codes in the original record group. The original record group is determined by where the read/write head (or software pointer) is located when the routine 700 is initiated. Step 704 is accomplished by consulting the marker code field 128 corresponding to the current record group.

Next, if the original record group lacks one or more marker codes, step 706 branches to step 714. Step 714 asks whether any record groups subsequent to the original record group contain any marker code(s). This is achieved by consulting the appropriate marker code fields 128 of the volume trailer 120. If step 714 finds that no record group subsequent to the original record group contains any marker codes, step 716 issues an error message, and the routine 700 ends in step 712.

Otherwise, if step 714 finds one or more record groups subsequent to the original record group that contain one or more marker codes, step 718 is performed. Step 718 consults the appropriate pointer field 124 of the volume trailer 120 to identify the beginning address for the first record group in the data sequence after the original record group, where such record group also contains a marker code. Then, starting at the beginning address, step 720 sequentially reads each record header starting at the beginning address until reaching the first marker code. In the illustrated embodiment, step 720 is performed by moving the read/write device (or software pointer) to the beginning address, then until reading the first marker code. When this marker code is found, the routine 700 ends in step 712.

In contrast to the foregoing description, steps 708–710 are performed rather than steps 714–720 if step 706 determines that the original record field does contain one or more marker codes. Step 708 advances the read/write device (or pointer) through the remaining records in the original record group, searching for the next marker code. If a marker code is found, step 710 directs control to step 712, where the routine 700 ends. At this point, having found the marker code by advancing thereto, the read/write device (or pointer) is positioned one record past the located marker code.

If no marker code is found, however, step 710 directs control to step 714, discussed above.

Backward Space File

Figure 8:
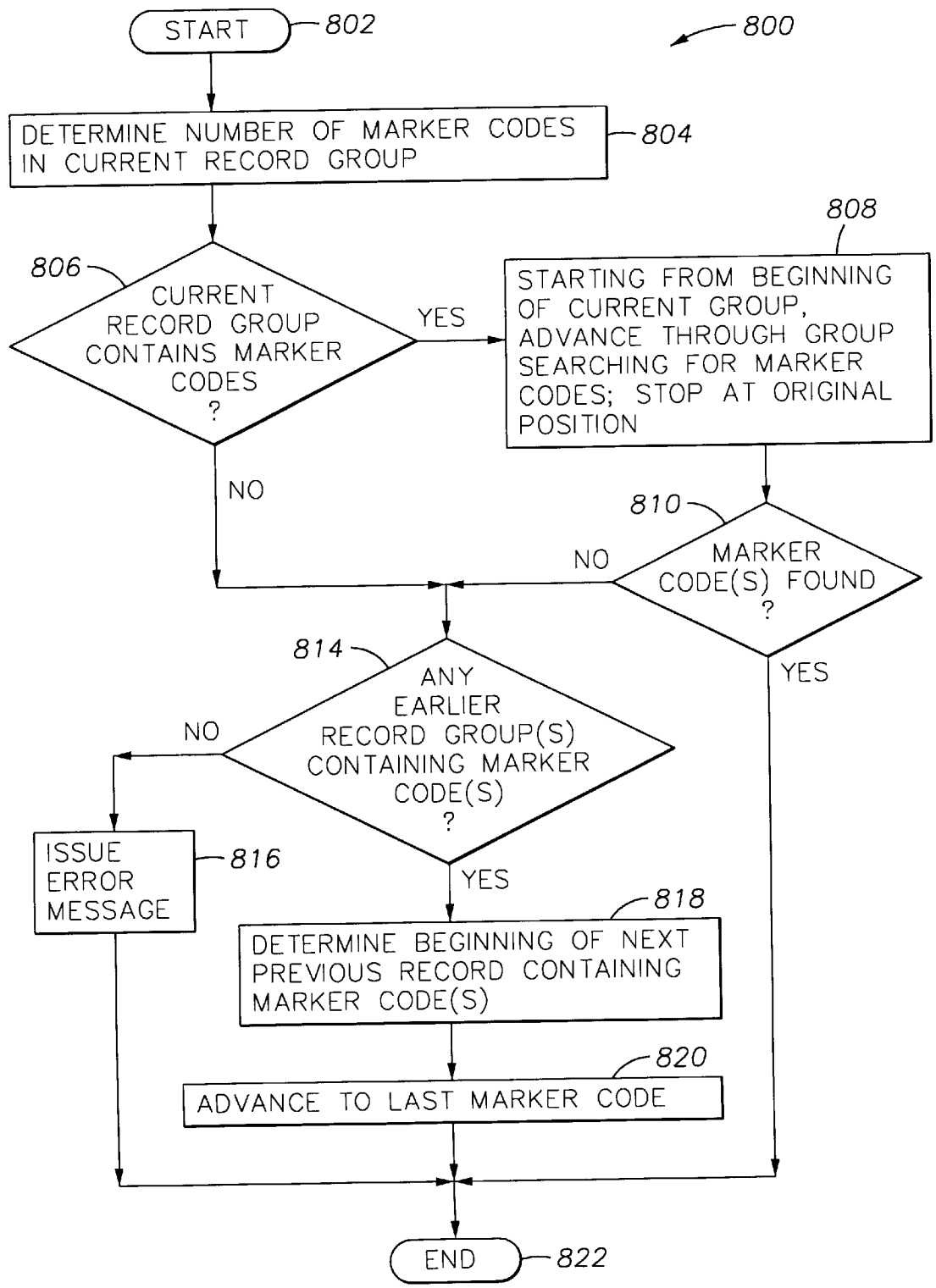
FIG. 8 is a backward space file routine according to the invention.

Another method of the invention concerns the reversing from an original address to an earlier address containing the next previous marker code to the original address. This emulates a tape operation called a "backward space file". A specific example of this method is illustrated by the sequence 800 of FIG. 8. For ease of explanation, but without any limitation intended thereby, the example of FIG. 8 is described in the context of the data storage subsystem 200 and volume 100 described above.

In the illustrated example, the steps 800 are initiated in step 802, when the storage controller 210 initiates a backward space file operation to reposition a read/write head (not shown) from an original address in the cache 206 to the next-previous marker code in the data sequence. Alternatively, instead of a physical device such as a read/write head, the routine 800 may serve to advance a software pointer from an original address to the next marker code. This embodiment is especially applicable where the cache 206 includes randomly accessible integrated circuit memory, such as RAM. The "original" or "current" address is the address at which the read/write head (or pointer) is positioned upon commencement of the routine 800.

After step 802, step 804 determines the number of tape marks in the original record group. There may be zero, one, or multiple marker codes in the original record group. The original record group is determined by where the read/write head (or software pointer) is located when the routine 800 is initiated. Step 804 is accomplished by consulting the marker code field 128 corresponding to the current record group.

Next, if the original record group lacks one or more marker codes, step 806 branches to step 814. Step 814 asks whether any record groups prior to the original record group contain any marker code(s). This is achieved by consulting the appropriate marker code fields 128 of the volume trailer 120. If step 814 finds that no record group subsequent to the original record group contains any marker codes, step 816 issues an error message, and the routine 800 ends in step 822.

Otherwise, if step 814 finds one or more record groups prior to the original record group that contain one or more marker codes, step 818 is performed. Step 818 consults the appropriate pointer field 124 of the volume trailer 120 to identify the beginning address for the first record group in the data sequence before the original record group, where such record group also contains a marker code. Then, starting at the beginning address, step 820 sequentially reads each record header starting at the beginning address until reaching the last marker code in the record group. In the illustrated embodiment, step 820 is performed by moving the read/write device to the beginning address, then performing forward space blocks until reading the last marker code in the record group. When this marker code is found, the routine 800 ends in step 822.

In contrast to the foregoing description, steps 808–810 are performed rather than steps 814–820 if step 806 determines that the original record field does contain one or more marker codes. Step 808 advances the read/write device (or pointer) from the beginning of the original record group, searching for the last marker code prior to the original address. More specifically, step 808 first consults the original record group's pointer field 124 to identify the beginning address for the original record group; then, starting at the beginning address, step 808 sequentially reads each record header starting at the beginning address until reaching the last marker code in the record group prior to the original address. If a marker code is found, step 810 directs control to step 822, where the routine 800 ends. At this point, having found the marker code by advancing thereto, the read/write device (or pointer) is positioned at the located marker code.

If no marker code is found, however, step 810 directs control to step 814, discussed above.

Other Embodiments

While there have been shown what are presently considered to be preferred embodiments of the invention, it will be apparent to those skilled in the art that various changes and modifications can be made herein without departing from the scope of the invention as defined by the appended claims.

For example, an alternative implementation of the volume trailer 120 contains information indicating the starting address of each record header in the volume 100, instead of (or in addition to) the starting address of each record group in the volume 100. In this embodiment, although the references to record groups are avoided, the storage size of the volume trailer 120 may be considerably larger.

What is claimed is:

1. In a direct access storage device (DASD), said DASD containing a sequence of machine-readable digital data including:

multiple record groups, each record group including multiple data records each preceded by a record header, each data record and each record header having a beginning address in the data storage medium, wherein at least one of the record groups includes a marker code; and a volume trailer concluding said sequence, said volume trailer including, for each record group:
  a pointer field containing the beginning address for the record group;
  a group count field containing a count of data records for the record group; and
  a marker count field containing a count of marker codes for the record group;

a computer implemented method of advancing from an original address to a target address containing the next marker code following the original address, said method comprising:
  consulting the volume trailer to determine a number of marker codes in an original record group;
  if the original record group contains marker codes, sequentially advancing through each remaining record until reaching a first one of the following: a first marker code, or an end of the original record group;
  if the end of the original record group is reached, or if the original record group does not contain any marker codes, consulting the volume trailer to determine whether any record groups subsequent to the original record group contain any marker codes,
  if no record groups subsequent to the original record group contain any marker codes, issuing an error message;
  otherwise, if one or more record groups subsequent to the original record group contains any marker codes,
    consulting the volume trailer to identify a beginning address for a first one of said record groups subsequent to the original record group containing any marker codes, and
    sequentially reading each record header in the first record group starting at the beginning address until reaching the first marker code in the first record group.

2. The method of claim 1, said advancing steps comprising advancing a read head of the DASD.

3. The method of claim 1, the said advancing steps comprising advancing a software pointer.

4. In a direct access storage device (DASD), said DASD containing a sequence of machine-readable digital data including:

multiple record groups, each record group including multiple data records each preceded by a record header, each data record and each record header having a beginning address in the data storage medium, wherein at least one of the record groups includes a marker code; and a volume trailer concluding said sequence, said volume trailer including, for each record group:
  a pointer field containing the beginning address for the record group;
  a group count field containing a count of data records for the record group; and
  a marker count field containing a count of marker codes for the record group;

a method of reversing from an original address to a target address containing the marker code previous to the original address, said method comprising:
  consulting the volume trailer to determine a number of marker codes in an original record group;
  if the original record group contains marker codes,
    consulting the volume trailer to determine the beginning address of the original record group, and
    starting at the beginning address, sequentially advancing through each remaining record until reaching a first one of the following: a last marker code prior to the original address, or the beginning address;
  if the beginning address is reached, or if the original record group does not contain marker codes, consulting the volume trailer to determine whether any record groups previous to the original record group contain marker codes,
    if no record groups prior to the original record group contain any marker codes, issuing an error message;
    otherwise, if one or more record groups prior to the original record group contains any marker codes,
      consulting the volume trailer to identify a beginning address for a last one of said record groups prior to the original record group containing any marker codes, and
      sequentially reading each record header in the at least one record group starting at the beginning address until reaching a last marker code in a last record group.

5. The method of claim 4, said advancing step comprising advancing a read head of the DASD through each remaining record until reaching a last marker code prior to the original address.

6. The method of claim 4, the said advancing steps comprising advancing a software pointer through each remaining record until reaching a last marker code prior to the original address.

7. A programmed product comprising signal-bearing media tangibly embodying a program of machine-readable instructions executable by a digital processing apparatus to perform a method for locating a desired machine-readable data record stored on a direct access storage device (DASD), said DASD containing a logically ordered sequence of digital data including:

multiple record groups, each record group including multiple data records each preceded by a corresponding record header, each data record and each record header having a beginning address in the data storage medium;

a volume trailer concluding said sequence, said volume trailer including for each record group:
  a pointer field containing the beginning address of the record group; and
  a group count field containing a count of data records for the record group;

said method of locating a desired data record comprising:
  receiving identification of a target data record including a record number indicating a position of the target data record in the logical ordering;
  referencing the one or more group count fields to identify a target record group containing the target data record;

referencing a pointer field corresponding to the target record group to identify a first address for the target record group;

computing a second address at which the target data record begins; and advancing to the second address.

8. The product of claim 7, the computing and advancing comprising:

reading a first record header at the first address to determine whether the first record header corresponds to the target data record; and if the first record header does not correspond to the target data record, repeatedly advancing to succeeding record headers and reading the succeeding record headers until a record header corresponding to the target data record is read.

9. The product of claim 8, the repeatedly advancing comprising repeatedly advancing a read head of the DASD to succeeding record headers and reading the succeeding record headers until a record header corresponding to the target data record is read.

10. The product of claim 8, the repeatedly advancing comprising repeatedly advancing a software pointer to succeeding record headers and reading the succeeding record headers until a record header corresponding to the target data record is read.

11. The product of claim 7, the volume trailer further including, for each record group, an equilength record field indicating whether all records of the record group are of equal length, the computing of the second address comprising:

computing an address jump distance equal to a difference in logical ordering between the target data record and a first data record in the target record group; and adding the address jump distance to the first address.

12. A programmed product comprising signal-bearing media tangibly embodying a program of machine-readable instructions executable by a digital processing apparatus to perform a forward space file process in a direct access storage device (DASD), said DASD containing a sequence of machine-readable digital data including:

multiple record groups, each record group including multiple data records each preceded by a record header, each data record and each record header having a beginning address in the data storage medium, wherein at least one of the record groups includes a marker code; and a volume trailer concluding said sequence, said volume trailer including, for each record group:
a pointer field containing the beginning address for the record group;
a group count field containing a count of data records for the record group; and
a marker count field containing a count of marker codes for the record group;

said forward space file process advancing from an original address to a target address containing the next marker code following the original address, and comprising:
consulting the volume trailer to determine a number of marker codes in an original record group;
if the original record group contains marker codes, sequentially advancing through each remaining record until reaching a first one of the following: first marker code, or an end of the original record group;
if the end of the original record group is reached, or if the original record group does not contain any marker codes, consulting the volume trailer to determine whether any record groups subsequent to the original record group contain any marker codes,
if no record groups subsequent to the original record group contain any marker codes, issuing an error message;
otherwise, if one or more record groups subsequent to the original record group contains any marker codes,
consulting the volume trailer to identify a beginning address for a first one of said record groups subsequent to the original record group containing any marker codes, and
sequentially reading each record header in the first record group starting at the beginning address until reaching the first marker code in the first record group.

13. The product of claim 12, said advancing steps comprising advancing a read head of the DASD.

14. The product of claim 12, the said advancing steps comprising advancing a software pointer.

15. A programmed product comprising signal-bearing media tangibly embodying a program of machine-readable instructions executable by a digital processing apparatus to perform a backward space file process in a direct access storage device (DASD), said DASD containing a sequence of machine-readable digital data including:

multiple record groups, each record group including multiple data records each preceded by a record header, each data record and each record header having a beginning address in the data storage medium, wherein at least one of the record groups includes a marker code; and a volume trailer concluding said sequence, said volume trailer including, for each record group:
a pointer field containing the beginning address for the record group;
a group count field containing a count of data records for the record group; and
a marker count field containing a count of marker codes for the record group;

said backward space file process reversing from an original address to a target address containing the marker code previous to the original address, and comprising:
consulting the volume trailer to determine a number of marker codes in an original record group;
if the original record group contains marker codes,
consulting the volume trailer to determine the beginning address of the original record group, and
starting at the beginning address, sequentially advancing through each remaining record until reaching a first one of the following: a last marker code prior to the original address, or the beginning address;
if the beginning address is reached, or if the original record group does not contain marker codes, consulting the volume trailer to determine whether any record groups previous to the original record group contain marker codes,
if no record groups prior to the original record group contain any marker codes, issuing an error message;
otherwise, if one or more record groups prior to the original record group contains any marker codes,
consulting the volume trailer to identify a beginning address for a last one of said record groups prior to the original record group containing any marker codes, and sequentially reading each record header in the at least one record group starting at the beginning address until reaching last marker code in a last record group.

16. The product of claim 15, said advancing step comprising advancing a read head of the DASD through each remaining record until reaching a last marker code prior to the original address.

17. The product of claim 15, the said advancing steps comprising advancing a software pointer through each remaining record until reaching a last marker code prior to the original address.

18. A data storage subsystem, comprising:
a direct access storage medium containing a sequence of digital data including:
multiple record groups, each record group including multiple data records each preceded by a record header, each data record and each record header having a beginning address in the data storage medium, wherein at least one of the record groups includes a marker code; and
a volume trailer concluding said sequence, said volume trailer including, for each record group:
a pointer field containing the beginning address for the record group;
a group count field containing a count of data records for the record group; and
a marker count field containing a count of marker codes for the record group; and
a processing unit, coupled to the data storage medium and programmed to perform a process for advancing from an original address to a target address containing the next marker code following the original address, said process comprising:
consulting the volume trailer to determine a number of marker codes in an original record group;
if the original record group contains marker codes, sequentially advancing through each remaining record until reaching a first one of the following: a first marker code, or an end of the original record group;
if the end of the original record group is reached, or if the original record group does not contain any marker codes, consulting the volume trailer to determine whether any record groups subsequent to the original record group contain any marker codes,
if no record groups subsequent to the original record group contain any marker codes, issuing an error message;
otherwise, if one or more record groups subsequent to the original record group contains any marker codes,
consulting the volume trailer to identify a beginning address for a first one of said record groups subsequent to the original record group containing any marker codes, and
sequentially reading each record header in the first record group starting at the beginning address until reaching the first marker code in the first record group.

19. The subsystem of claim 18, said advancing steps comprising advancing a read head of the DASD.

20. The subsystem of claim 18, the said advancing steps comprising advancing a software pointer.

21. A data storage subsystem, comprising:
a direct access storage medium, containing a sequence of machine-readable digital data including:
multiple record groups, each record group including multiple data records each preceded by a record header, each data record and each record header having a beginning address in the data storage medium, wherein at least one of the record groups includes a marker code; and
a volume trailer concluding said sequence, said volume trailer including, for each record group:
a pointer field containing the beginning address for the record group;
a group count field containing a count of data records for the record group; and
a marker count field containing a count of marker codes for the record group;
a processing unit, coupled to the data storage medium and programmed to perform a process for reversing from an original address to a target address containing the marker code previous to the original address, said process comprising:
consulting the volume trailer to determine a number of marker codes in an original record group;
if the original record group contains marker codes,
consulting the volume trailer to determine the beginning address of the original record group, and
starting at the beginning address, sequentially advancing through each remaining record until reaching a first one of the following: a last marker code prior to the original address, or the beginning address;
if the beginning address is reached, or if the original record group does not contain marker codes, consulting the volume trailer to determine whether any record groups previous to the original record group contain marker codes,
if no record groups prior to the original record group contain any marker codes, issuing an error message;
otherwise, if one or more record groups prior to the original record group contains any marker codes,
consulting the volume trailer to identify a beginning address for a last one of said record groups prior to the original record group containing any marker codes, and
sequentially reading each record header in the at least one record group starting at the beginning address until reaching a last marker code in a last record group.

22. The subsystem of claim 21, said advancing steps comprising advancing a read head of the DASD.

23. The subsystem of claim 21, the said advancing steps comprising advancing a software pointer.

* * * * *